(12) United States Patent
Blom et al.

(10) Patent No.: US 6,391,416 B1
(45) Date of Patent: May 21, 2002

(54) LABELLED, RETURNABLE PLASTIC CRATE

(75) Inventors: Patrick Johannes Blom; Erwin Anton Rosens, both of Leiden (NL); Thomas Lynn Brandt, Windsor; Daniel Nathaniel Wilkens, Freeville, both of NY (US)

(73) Assignee: Heineken Technical Services B.V., Amsterdam (NL)

( * ) Notice: Subject to any disclaimer, the term of this patent is extended or adjusted under 35 U.S.C. 154(b) by 0 days.

(21) Appl. No.: 09/155,030

(22) PCT Filed: Mar. 19, 1997

(86) PCT No.: PCT/NL97/00140
   § 371 Date: Sep. 17, 1998
   § 102(e) Date: Sep. 17, 1998

(87) PCT Pub. No.: WO97/34810
   PCT Pub. Date: Sep. 25, 1997

(30) Foreign Application Priority Data

Mar. 20, 1996 (NL) .......................................... 96200780

(51) Int. Cl.[7] .............................................. B65D 25/20

(52) U.S. Cl. ...................... 428/40.1; 40/299.01; 40/310; 40/312; 283/81; 428/40.5; 428/41.3; 428/41.5; 428/41.7; 428/200; 428/203; 428/204; 428/345; 428/355; 428/424.4; 428/424.8

(58) Field of Search ................................. 428/40.1, 200, 428/203, 204, 355, 345, 424.4, 424.8, 35.7, 40.5, 41.3, 41.5, 41.7, 42.1, 914; 40/299.01, 310, 312; 283/81

(56) References Cited

U.S. PATENT DOCUMENTS

| 4,548,857 A | * | 10/1985 | Galante | 428/200 |
| 5,094,912 A | * | 3/1992 | Deibig et al. | 428/355 |
| 5,104,719 A | | 4/1992 | Kamen et al. | 428/195 |

FOREIGN PATENT DOCUMENTS

| WO | WO 90/05088 | 5/1990 |
| WO | 97/32293 | 9/1997 |

* cited by examiner

*Primary Examiner*—Nasser Ahmad
(74) *Attorney, Agent, or Firm*—Pearne & Gordon LLP

(57) ABSTRACT

The invention is directed to a returnable plastic crate provided on at least one surface with an ink only label that is removable without destructive treatment of the said surface, said label being adhered to said at least one surface by an activated adhesive layer.

14 Claims, 7 Drawing Sheets

LABEL & SUBSTRATE
EXPLODED VIEW

LABEL & SUBSTRATE
EXPLODED VIEW

LABELLED, RETURNABLE PLASTIC CRATE

BACKGROUND OF THE INVENTION

The present invention is directed to a returnable plastic crate provided with at least one ink only label, to a process for applying an ink only label to a polymeric surface and to a system for using returnable crates.

More in particular the present invention is directed to a technique for labelling returnable plastic crates and more specifically to a technique for applying decorative promotional and/or informational labels to plastic crates. Still more particularly, the invention is directed to a technique for using a label composite which applies only the inks of the graphics to a polymeric substrate, a method for applying the label inks to the crate, a method of strengthening of same through a post coating encapsulation of the inks in conjunction with a post treatment, and finally the ability to remove the composite ink label without altering the crate, i.e. without destructive treatment of the substrate surface, so that it can be relabelled.

Plastic crates are presently labelled in one of three different ways. The predominant method is to silk screen a non-removable permanent image prior to end user use. Such labels offer a highly durable finish with 2 or 3 color availability to promote enclosed product at the consumer level. This technique offers limited colors, lacks the improved graphics that other labelling techniques offer, is not flexible in its ability to have graphic changes to meet market strategies leading to large inventories of obsolete units, tends to show signs of wear after only four (4) trips (typical crate life expected at 60 return trips) and is relatively expensive as compared to other label techniques.

A second way encompasses glueing printed paper labels to the plastic crates at the time of filling and sealing. This type of label offers an almost unlimited art potential. However, this type of label offers little resistance to label damage from handling and exposure to moisture and will not survive the washing procedures required of a returnable container thereby requiring relabelling.

A third, and more recently developed crate labelling technique, is that of applying a thin pressure sensitive label. This is a widely used method but has limited service life, it is difficult to remove when desired and is comparatively expensive.

The need for the returnable crate is a direct result of industry preference and government legislation with regard to returnable (refillable) containers in various parts in the world in lieu of one way packaging. In this type of recycling environment a whole new market has been created for the handling of packaged beverage containers. This is presently true of both refillable PET and glass bottle containers. Certain countries, Europe in particular, have invested large sums of money in the creation of distribution systems that rely heavily on the returnable crate concept.

Typically the only product presentation in such a recycling (refillable) market is that which can be printed on the exterior of the crate. Due to handling, space and storage considerations the only marketing, name brand, promotional, UPC code or other informational presentation is that which is printed on the exterior of the crate. The reason is that typically the crates are stacked at commercial outlets such as grocery stores with only the side and end panels showing. As such, the presentations on the said panels of the crates are the only distinguishing features from one product to another.

In the use of returnable crates it would be very interesting to be able to use one uniform crate for various different products or brands. However, this is only possible if there exists an easy and inexpensive method of providing an image or imprint on the crate, which is also easily removed after the crate is returned to the bottling line for refilling.

On the other hand, it is important that the label, image or imprint on the crate is durable, especially during transport and storage, more importantly is durable even when subjected to humid conditions.

Accordingly it is an object of the invention to provide a returnable plastic crate having an imprint, label or image on at least one of its surfaces, which is durable, scratch, wear, weather and moisture resistant during use, but which is easily removable during crate washing upon return to the factory.

It is another object of the present invention to offer a method of labelling plastic containers such as beverage bottle crates.

It is a further object of this invention to label the plastic container at the time of beverage bottle loading so that the label is indicative of the special contents.

It is also an object of the invention that the label on the plastic container shall be impervious to all handling contact and ambient storage conditions both outdoor and indoor.

It is also an object of the invention that the label, if desired, be readily and completely removed in the standard crate washer used when the plastic container is returned to the beverage plant for refilling.

It is also an object of the invention that the properties of the label with respect to removing it can be controlled, so that the label will not be removed or damaged in standard crate washing operations, but only under specific, more severe crate washing operations.

It is an object of the present invention that the labels incorporate a full range of graphics, from a simple one color up to a full photographic reproduction.

Finally it is also an object that the method be simple and low cost.

SUMMARY OF THE INVENTION

These and other objects are achieved by the returnable plastic crate according to the present invention, which is provided on at least one surface with an ink only label that is removable by caustic washing, said label being adhered to said at least one surface of said crate by an activated adhesive layer.

In this respect the term "ink only label" is used to define a label that does not have a paper or plastic backing, but which comprises an image layer of ink, which is directly applied to a surface. Quite often the surface remains at least partly visible through the image layer. An ink only label may conveniently be applied to a surface by image transfer, using a reverse printed label.

The label to be used in accordance with the present invention is essentially based on an ink image without a backing material. The ink image is adhered to the surface of the crate by an adhesive, and the surface of the image may be protected by a protective layer.

The present invention provides a distinct improvement over the prior art systems, which were based on paper or plastic labels. In order to remove these labels expensive high pressure equipment was necessary, especially in case labels were required on adjacent sides of the crate. Removal of the labels through simple soaking, as in the present invention, is virtually impossible. Further the residues of the labels have a tendency to clog the crate washing equipment.

The system of the present invention is less expensive and environmentally more friendly, as the residues of the ink only label are easily recovered from the soaking water and recycled.

The present invention also provides the possibility to use the label for scanning possibilities, for example by including a UPC (bar) code therein, which code may be used to define the recipient, the contents or any other information that is suitable. The system also allows the producer to reduce the stock of crates, as it is no longer necessary to keep stock crates of all brands or types. The system according to the present invention makes it possible for a producer to have only one type of crate for each type of material, for example bottle, irrespective of the brand of the material. This makes it possible to reduce tie stock of crates tremendously. Of course the reductions would be even greater if the whole industry in a country or continent would decide to use the system.

In such a case many different producers (bottlers) of beverage containers would share common crates, and yet maintain individual market identification via the present invention. At the same time an improved, user friendly and costs effective recycling system would be perfected. Such a system could be utilized on a national or even a multi national level.

According to a preferred embodiment a transparent protective coating is present on top of the ink only label.

This coating improves the resistance of the label against environmental influences. Generally the material of the protective coating is compatible with the material of the ink. More preferably all materials, adhesive, ink and protective coating are based on acrylate polymers. In order to improve the durability of the label further, it may be advantageous that after application of the label (and the coating) one or more treatments are given. These treatments provide a coalescence of the materials of the various layers, resulting in improved service life, however, without deteriorating the wash-off behavior.

By careful selection of the composition of the label, the use of a protective coating and the nature of the post treatment, it is possible to steer the properties of the label, especially with respect to the behavior during crate washing. More specifically, it is possible to design the system in such a way, that the label is removed during standard crate washing. This means that after each return to the beverage filling plant, the label is removed and a new, optionally different, label may be applied. On the other hand, the label may be made so durable that it will not be removed or damaged during standard crate washing, but only in case a specific, severe washing operation is used. In this way the label is not permanent, however it has all the advantages of a permanent imprint, for example a silk screen, without the disadvantages thereof, such as the high costs thereof in terms of investments and energy requirements, inflexibility and low number of colors.

The selection of the adhesive to be used in adhering the label image to the crate surface will at least partly depend on the intended service life of the label, one-way or multiple trip use. Of course the adhesive must remain removable during crate washing. The adhesive must have been activated prior to or during application of the image to the crate. An easy and generally preferred method of applying the image is through the use of heat activatable adhesives, that have been applied to the image in the form of a reverse printed label. Other methods include the use of adhesives that can be activated through radiation, chemicals, electron-beam, micro-wave, UV and the like. It is also possible to use adhesives that can be activated through photo initiation, humidity, enzymatic action, pressure or ultra-sonic treatment.

It is preferred to use adhesives that are activated either by heat or by pressure. The latter case also encompasses adhesives, which require pressure to remain adhered, although they may have some tackiness without pressure.

The adhesive is preferably present on the back side of the image before it is applied to the crate surface. However, it is also possible to apply the adhesive to the crate prior to transferring the image. Another possibility is the use of inks in the image that have the adhesive incorporated therein.

The protective layer, if used, may be applied after the image has been transferred to the crate, for example using a conventional roller coater. In the alternative the protective layer may be part of the image material as it is transferred The present invention also provides for a method of applying an ink only label to a polymeric surface, more in particular to a crate surface.

The method of the present invention comprises in its broadest form:
  providing the surface, preferably moving at a uniform rate,
  presenting a reverse printed label on a substrate, separable from its substrate and preferably over printed with an activatable adhesive, and
  transferring the label ink to the polymeric surface.

The label is applied to the polymeric surface which has preferably been surface treated and temperature stabilized. The label is applied by transferring the ink from its film substrate utilizing a roller, a pad, a doctor blade or an air knife. Preferably a heated roller is used under pressure. As indicated previously, the adhesive may either be present on the label or may be on the polymeric surface. The adhesive has to be activated prior to or during transfer depending on the type of adhesive, the activation method will differ. The skilled person will be aware which type of activation will be required. In case of a pressure sensitive adhesive, pressure will be applied during transfer. If a heat activatable adhesive is used, it is preferred to preheat the polymeric surface, optionally in combination with a heated transfer system, such as a roller.

In a preferred embodiment a heat activatable adhesive is used, in combination with a heat-pretreatment of the polymeric surface. As the heat activated adhesive printed over the ink becomes tacky, the ink is released from the film substrate and adheres to the plastic surface.

The labels may be supplied on a roll, from which the images are transferred to the substrate, optionally in combination with a cutting operation. It is also possible to provide a stack of separate labels, using a suitable application device.

Depending on the requirements on the image it may be preferred to have a protective coating on top thereof. This coating may have been applied as part of the reverse printed label during image transfer. In a preferred embodiment the protective coating is applied after image transfer, for example by the use of a roller coater.

In that situation, the transfer surface is coated with a thin layer of protective coating, such as an acrylic wax. Subsequently a post treatment, preferably one or more heat treatments are given. With this treatment the label materials coalesce and without being bound thereto, it is assumed that the durable bond obtained thereby is affected through inter diffusion of the adhesive and plastic surface.

In case the image has to be more durable, for example for multi-trip use, it is preferred to use either a more durable coating, such as a urethane, and/or a prolonged, more severe post treatment.

It is well-known that polymeric materials and especially high density polyethylene in particular, are difficult materials to bond with adhesives. This invention describes a specific method of surface treatment to ensure adhesive bonding that is fast and economical.

An important discovery described in the invention is the coalescing of the label materials and surface coating by exposing the labelled area to very high temperatures for a few seconds to increase durability and resistance to moisture. This process alters the label composite from a series of adhered layers which are easily dissociated with immersion in water for 2 or more hours to a coalesced matrix of label adhesive, label inks and outer coating. During the heating the adhesive material inter diffuses with the plastic surface. The simultaneous coalescing and inter diffusion of this preferred embodiment of the invention result in a very durable label matrix. Resistance to water immersion can be varied from a few hours to several weeks by varying the time of exposure and the resultant temperature.

It should be noted, that the resistance to water immersion of an untreated label according to the invention may be sufficient as it never completely loses its bonding with the polymeric surface. The bonding only weakens; drying restores the bonding strength to its original value.

Having achieved the required label durability, it is also necessary to remove the label after it has served its purpose of identifying the contents of the container prior to consumption. The empty plastic containers and beverage bottles are returned to the beverage plant for refilling. The plastic containers are washed. During this wash the label must either be completely removed, or remain on the surface undamaged, depending on the situation (one-way or multi-trip).

In the former case, the heat treated adhesive used to bond the ink matrix, while durable in water, breaks down in the washing solution, preferably hot caustic, enabling the label and adhesive to be completely removed. The label residue is filtered out of the caustic solution. In the latter case the label is only removed when the washing conditions are changed to remove the label, for example by using a prolonged soaking and/or a stronger caustic solution, optionally in combination with the use of high pressure jets (liquid or gas).

Alternative methods for removing the images without a destructive treatment of the substrate (polymeric) surface comprise chemical removal (solvents), ultra sonic, sub-cooling, heating, brushing, enzymatic treatment, vacuum treatment, peeling and radiation, such as UV. Combinations of various methods are of course also possible.

It may be desirable that the processing equipment be arranged so that the plastic containers are labelled in-line during the normal progression through the beverage facility, so that the crate label matches the bottle contents.

DETAILED DESCRIPTION OF THE INVENTION

Figure 1:
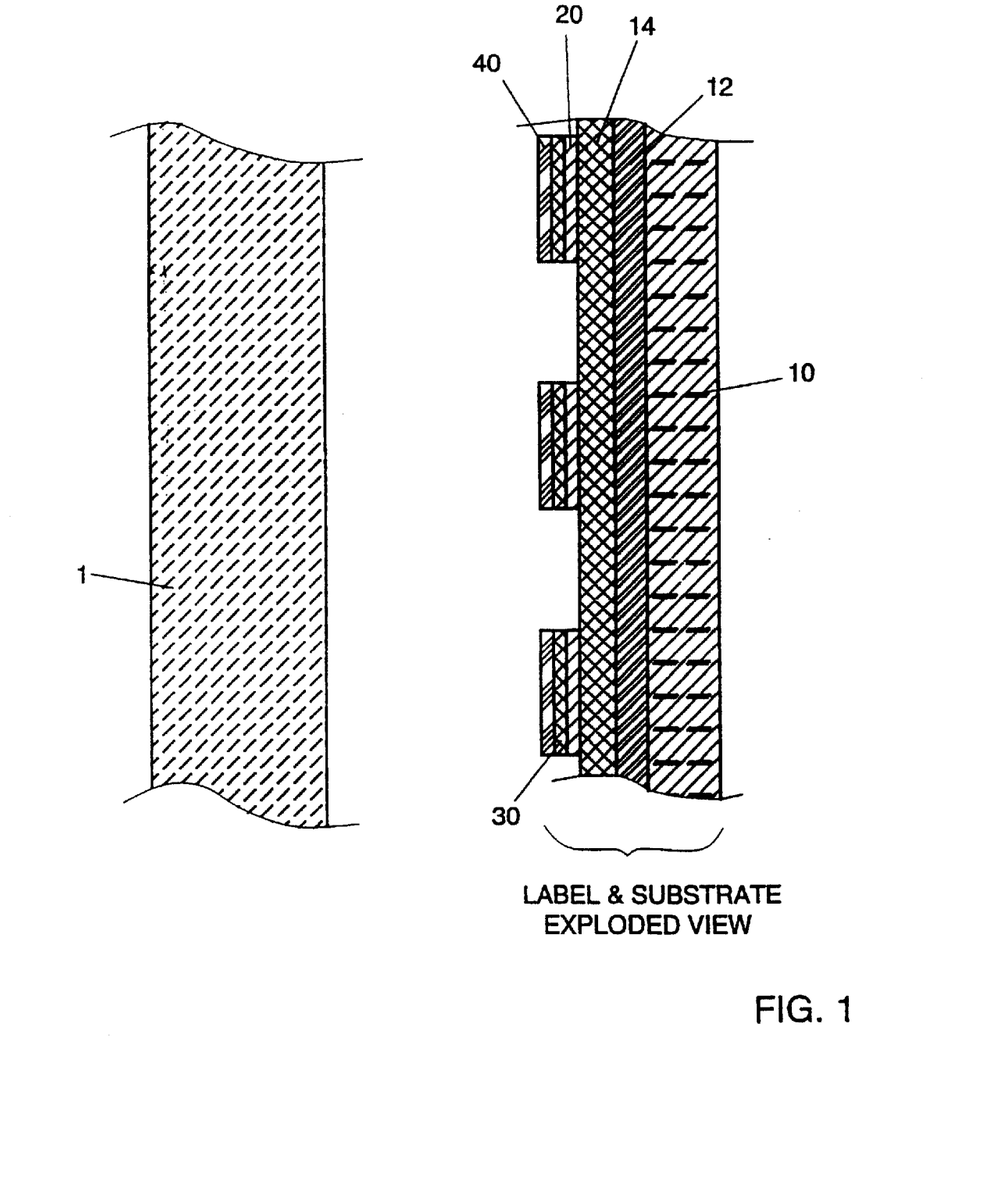
FIG. 1 Heat Transfer Label

The preferred embodiment of the label and application according to the present invention will be described first with references to FIG. 1 which shows the plastic container (1) and the label positioned for application. The label is printed on a film substrate (10) which may be any thin film, but in the case described is polypropylene of 2 mils thickness. (14) is an acrylic coating which may or may not be employed, depending on the type and source of the film available. (12) is a release material which coats the film. In the case of the invention it is silicone which is applied at the time of film manufacture. (20) represents all the printed ink material. Depending on the label graphics and opacity requirements the ink materials may be as many as five (5) different colors in one or more layers, some of which may overlay another. (30) and (40) represent two (2) layers of adhesive to indicate the build up of adhesive from 0.5 to 1.5 pounds per ream, depending on the labelled surface uniformity and rigidity of the container being labelled.

Upon application, all of the printed materials are transferred from the silicone release coated film substrate. The printed ink materials are vinyl or acrylic resin based, colored with temperature and ultra violet stable pigments.

In the case of white ink, titanium dioxide is the pigment of choice. Pigment particle size ranges from three (3) to five (5) $\mu$m. The printed adhesive is a urethane modified acrylic with an initial tack temperature of 175° F. (80° C.). This initial tack temperature is very important to the plastic labelling process because it determines the required plastic surface temperature at the time of transfer. With the particular plastic container being labelled, there is no support of the inside surface, hence it is desired to maintain the plastic below 200° F. (93° C.) to avoid distortion of the surface by reaching its point of deformation during the label transfer.

Figure 2:
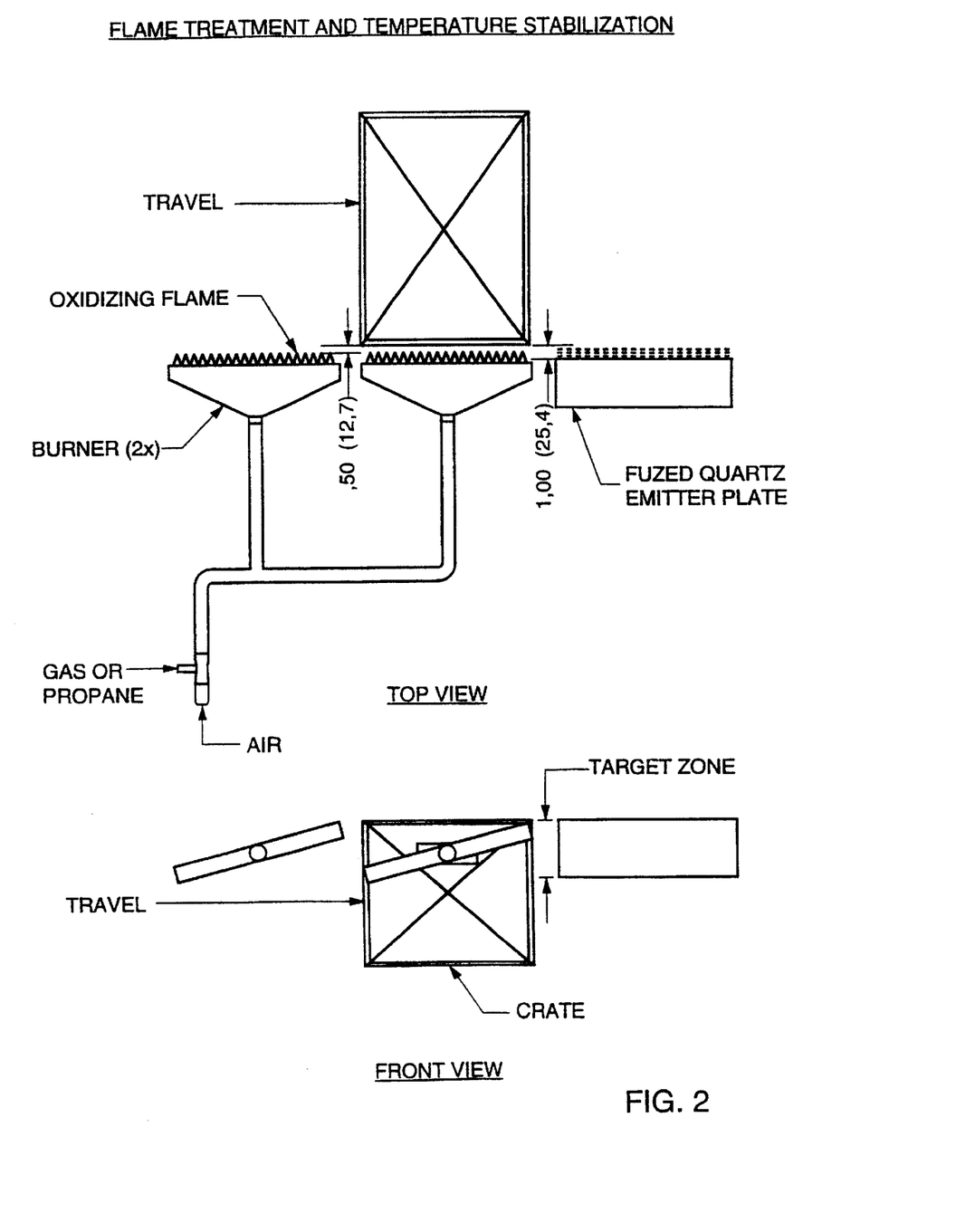
FIG. 2 Surface Treatment and Temperature Stabilization

The label application method will now be described in the order of peogression. FIG. 2 shows the technique of surface treatment and temerature stabilization. For adhesion of two polymeric materials to occur, many factors must be connsidered such as cleanliness, pressure, temperature, contact time, surface roughness, movement during bonding and adhesive film thickness. An additional important consideration is the critical surface tension. The commonly accepted method of measuring the critical surface tension is with a Dyne solution, which is well known. For most adhesive applications the critical surface tension of polyethylene is 31 Dynes per centimetre. A series of tests were performed which demonstrated for best adhesion of the adhesive previously described to the polyethylene surface, a treatment level of 60 to 70 Dynes per centimetre was necessary. Further testing of commercially available equipment showed that flame treatment optimized both capital cost, operating cost and time required to achieve the required critical surface treatment.

For the adhesive to achieve and maintain tack quickly it is necessary to heat the polyethylene container before the label adhesive is in contact with it. To avoid deforming the container, it is desirable not to heat the surface over 200° F. (93° C.). As the surface temperature leaving the flame treatment is approximately 125° F. (52° C.), it is necessary to heat the surface approximately 75° F. (24° C.). Here again, many options are available for heating. Hot air, additional flame heaters, gas fired infra-red panels and electric ceramic panels were all tested and found to be either too slow or difficult to control. It was found that an electrically heated flat fused quartz emitter plate with zonal band control for localized label transfer would provide maximum free air transmission of infra-red energy without the effects of ambient environmental factors. With an emissivity of 0.9 for polyethylene a desired temperature of between 1650° F. (900° C.) to 1725° F. (940° C.) will emit the most efficient wavelength (2.5 to 3.2 μm) of infra-red energy for peak absorption. The unit tested was rated at 60 watts per square inch. The time to heat the polyethylene surface the necessary 75° .F (24° C.) was 4.5 seconds at a distance from the emitter plate of 2.5 centimetres.

Figure 3:
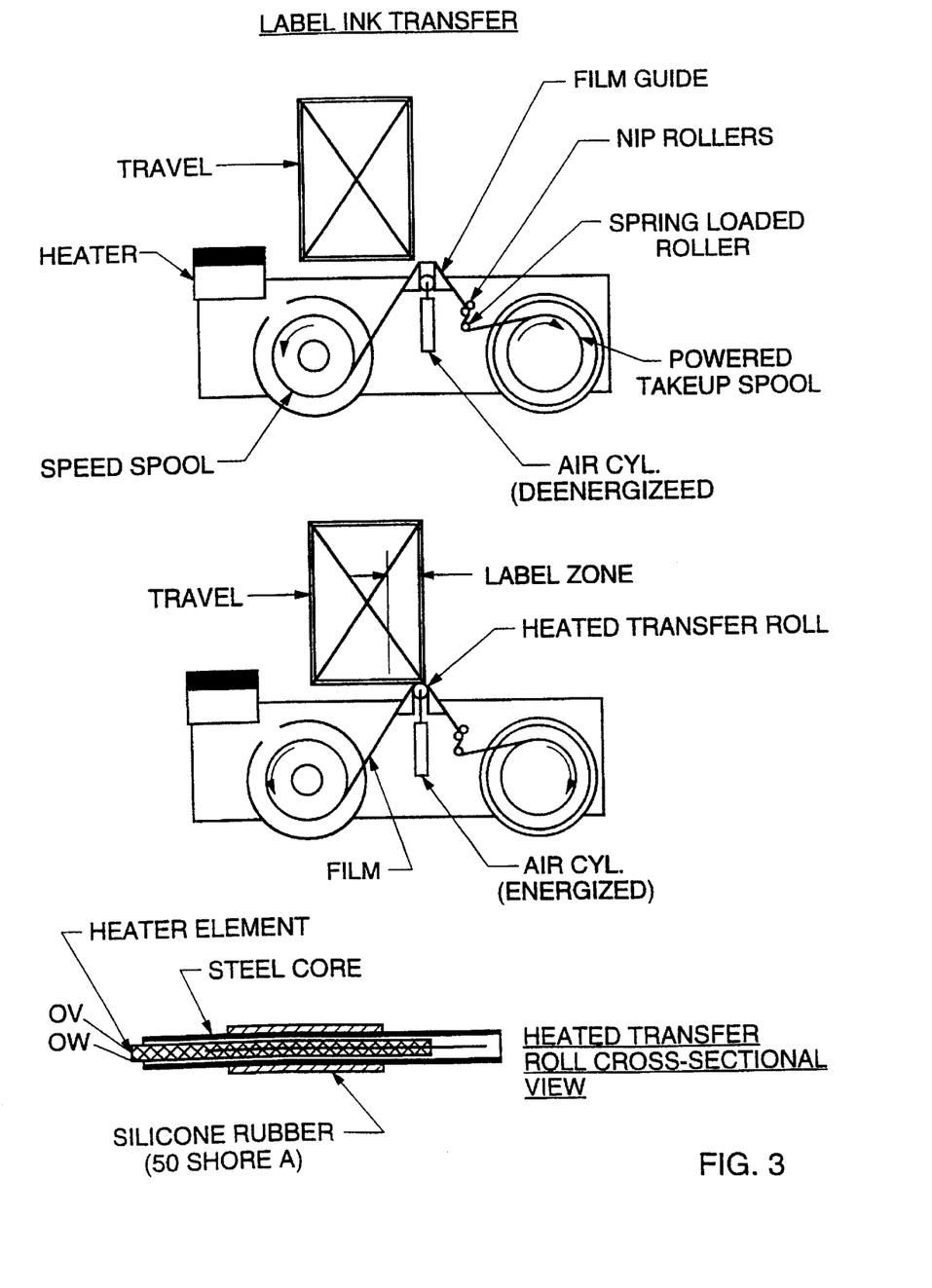
FIG. 3 Label Application and Ink Transfer

FIG. 3 illustrates the method of label application whereby the printed ink materials are transferred from the polypropylene film substrate to the polyethylene surface utilizing the tactile characteristics of the heat activated adhesive to overcome the bond of the ink layer 14 to the corona treated silicone coating 12. The factors that influence transfer are time to contact, temperature during contact and film tension during contact particularly tension on the film after ink release. Pressure roll diameter is also a factor but not a variable. For this application the roll diameters are 38 mm. The rollers were made of silicone rubber over a steel core, with rubber durometer ranging from 50 Shore A to 80 Shore A. It should be noted that distortion (flattening) of the rubber roller is less at the higher durometer, consequently the contact area is less and the transfer pressure is greater. This is important at the higher line speeds where contact time is inimized. Thus a crate moving 18.3 meters per minute (60 feet per minute) past a roller of 38 mm diameter will have a contact time of 1 millisecond per 1 degree of roller rotation where there is no roller distortion.

Roller pressure is provided by an air cylinder activated by a conventional solenoid valve which in turn is operated by two (2) proximity switches, one to advance the roller and the other to retract. Other means, such as mechanical linkage are obvious and will not listed here. The pressure is distributed across the length of the cylinder and for this particular ink, transfer ranges from 12 to 17 kilograms per centimetre of roller length. See Figure A.

Thus the invention results in the film being advanced at exactly the same rate as the crate is moving past the roller by virtue of the heat activated adhesive adhering to the high energy crate surface. The pressure roller, which rotates freely, maintains the same tangential speed as the linear speed of the film and crate. Thus the ink is transferred completely and without distortion.

For purposes of fast and complete adhesion the pressure roller is molded to a hollow core. Suspended within the hollow core is a resistance heater operated through a controller. The heating element, rated at 500 W, will maintain the roller surface at any predetermined temperature. For purposes of the invention, the roller surface temperature range between 250° F. and 370° F. (120° C. and 190° C.). See Figure B.

Many silicone coated polymer films may be used for the printed substrate, High temperature films such as polyester may be operated in continuous contact with the heated roller. Low temperature films such as polypropylene must be prevented from contacting the heated roller during pauses in the labelling operation. To accomplish this, film guides are used to support the film when the roller is retracted. The guides are mounted to maintain a clearance of approximately 13 mm between the guides and the labelled surface.

At the same time the roller is retracted approximately 13 mm behind the film. By maintaining those clearances, stretching and distortion of the film such as polypropylene is avoided. High temperature films would not require the guides.

It has also been discovered that film tension, especially on the film exit side of the roller, is important to complete ink transfer. Through trials, it was found a continuous tension of approximately 2.5 kilograms is useful. This is achieved through a spring loaded dancer arm and roller.

Conventional nip rollers and stepping motor are used to advance the film to the next label and position it accurately, using a printed mark to trigger an optical scanning device.

Figure 4:
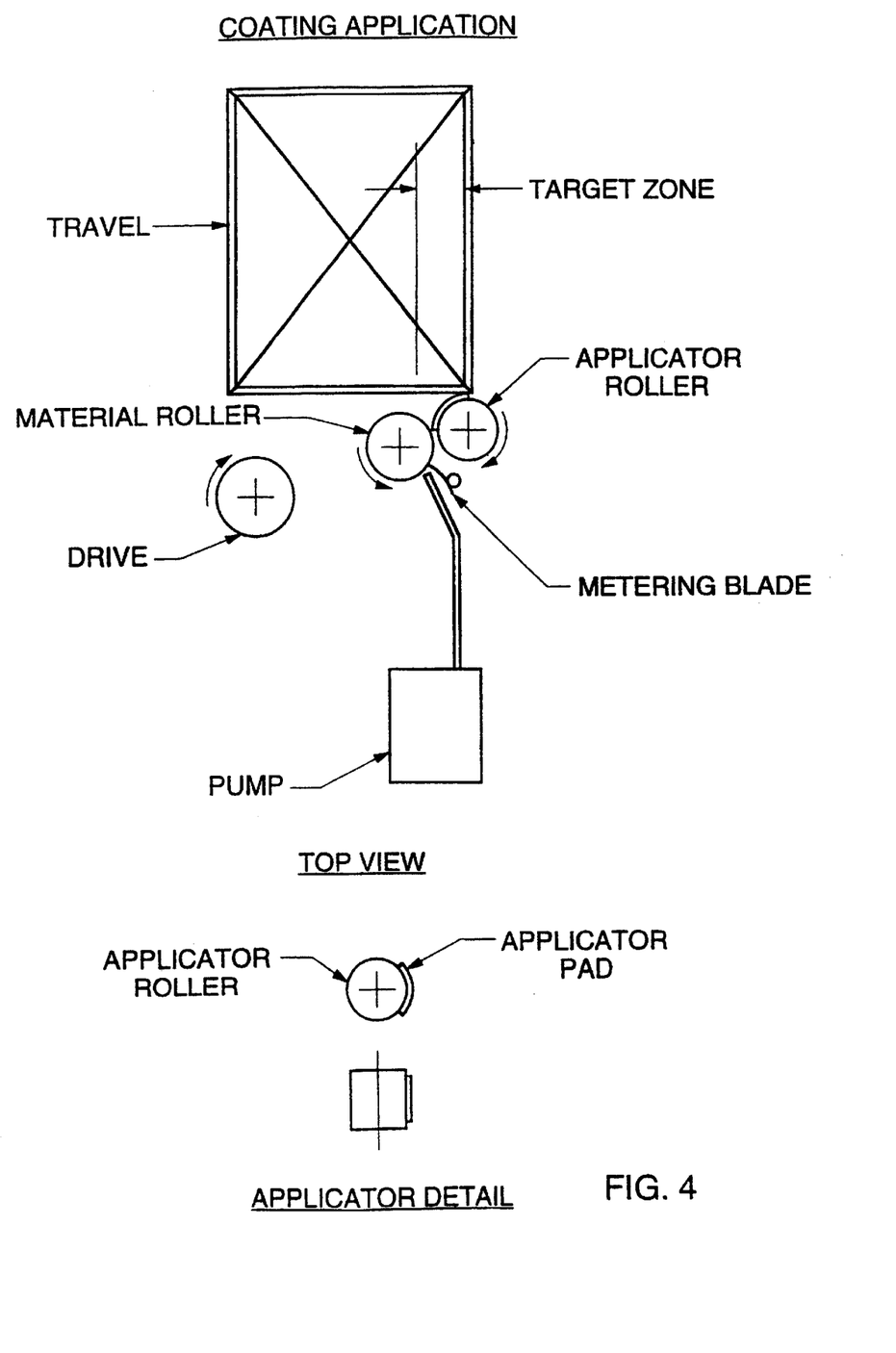
FIG. 4 Coating Application

Protection of the ink against scratching by casual handling as well as insuring its weatherability when subjected to outdoor storage is achieved with the application of an acrylic based wax water emulsion as shown in FIG. 4. This is applied by a roll applicator which is supplied from a wet roller with a controlled amount of coating. Control is achieved with a doctor blade. The coating extends well past the edges of the ink pattern and seals the edges from intrusive moisture.

Figure 5:
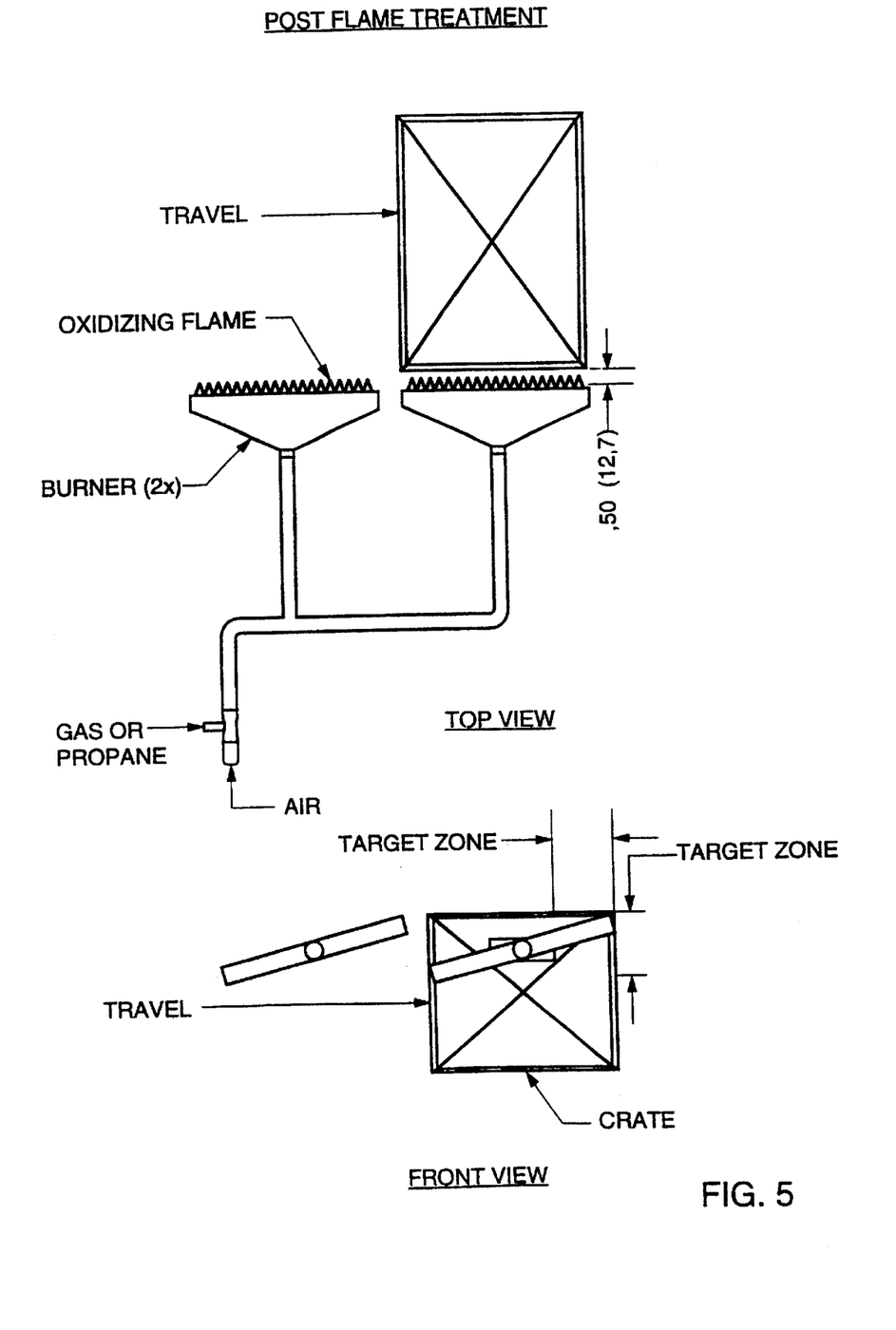
FIG. 5 Post Treatment

The final processing step is to coalesce the layers of the coating, label ink, and adhesive and also to inter diffuse the adhesive layer with the polyethylene substrate as shown in FIG. 5. This discovery was made through extensive trials of many heating systems. As flame treatment was discovered to be the best technique that would provide the required surface energy for label adhesion, so it was discovered that flame treatment of the label and coating composite was the best technique that would develop the required water immersion durability without sacrificing mechanical properties or altering the visual characteristics of the applied label, or distorting the polypropylene crate.

Figure 6:
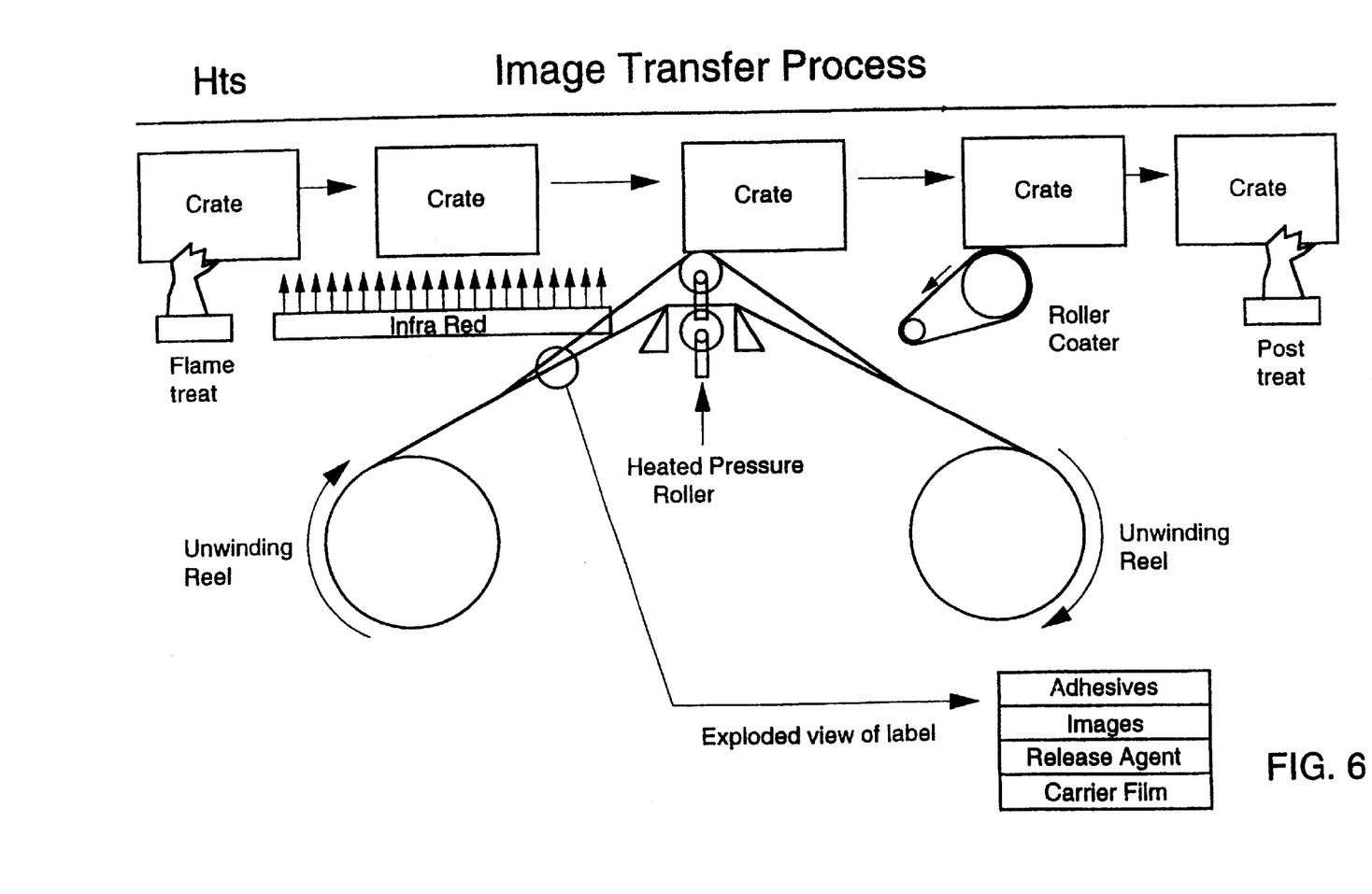
FIG. 6 Specific embodiment of image transfer process
Figure 7:
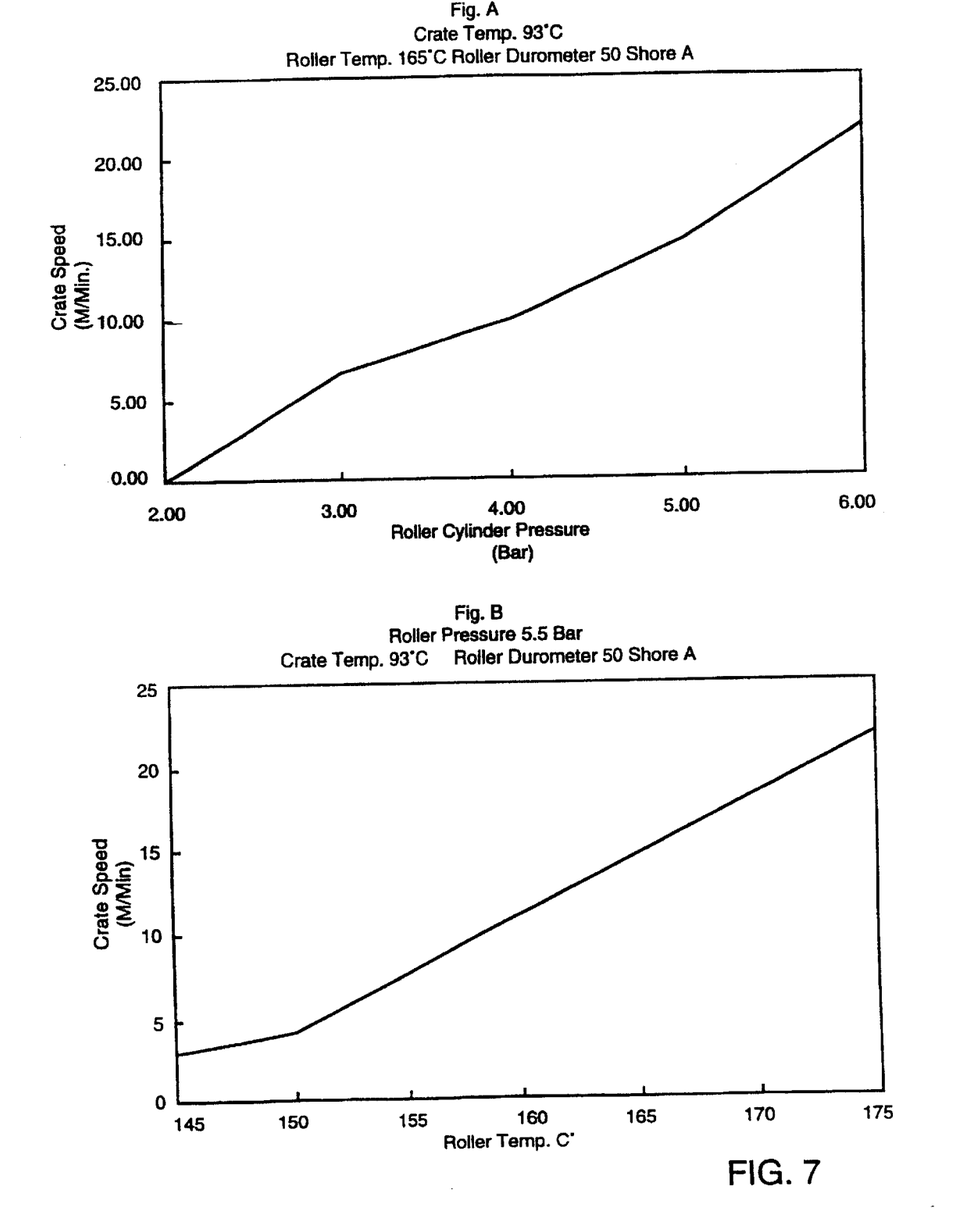
FIGS. 7A and 7B show graphs relating to crate speed varied with roller cylinder pressure and temperature.

In FIG. 6 the presently developed best mode of application of the invention is shown.

It will be appreciated that further modifications could be made to the embodiment disclosed above, while still obtaining many of the advantages and without departing from the spirit and scope of the invention as defined in the appended claims.

What is claimed is:

1. Returnable plastic crate provided on at least one surface with an ink-only label consisting of (a) at least one ink-only layer and (b) an activatable adhesive layer, which label is removable from the surface without destructive treatment of the said surface, said ink-only label being adhered to said at least one surface by the activation of said activatable adhesive layer, said label being readily removable during a crate washing operation, said adhesive layer being heat activatable and having an initial tack temperature of not more than 90° C.

2. Crate according to claim 1, wherein a transparent, protective coating has been applied over said ink-only label.

3. Crate according to claim 1, wherein the adhesive layer loses its adhesion when treated with an aqueous alkaline solution.

4. Crate according to claim 1, wherein at least part of the surface consists of polyethylene.

5. Crate according to claim 1, wherein said adhesive layer and ink-only layer are coalesced.

6. Crate according to claim 1, wherein the ink is a polymeric ink.

7. Crate according to claim 1, wherein the adhesive is a urethane-acrylic adhesive.

8. Crate according to claim 2, wherein the protective coating is based on an acrylic wax.

9. Crate according to claim 5, wherein a protective layer has been applied over said ink-only label.

10. Crate according to claim 6, wherein the polymeric ink is a vinyl-based ink.

11. Crate according to claim 6, wherein the polymeric ink is an acrylic-based ink.

12. A returnable plastic crate according to claim 1, wherein said ink-only layer and said adhesive layer are each of materials based on acrylate polymers.

13. A returnable plastic crate according to claim 1, wherein said crate is made of polyethylene.

14. A returnable plastic crate according to claim 1, wherein said adhesive layer has an initial tack temperature of not more than 80° C.

* * * * *

UNITED STATES PATENT AND TRADEMARK OFFICE
CERTIFICATE OF CORRECTION

PATENT NO.    : 6,391,416 B1
DATED         : May 21, 2002
INVENTOR(S)   : Blom et al.

It is certified that error appears in the above-identified patent and that said Letters Patent is hereby corrected as shown below:

<u>Title page,</u>
Item [86], § 371 Date and § 102(e) Date, please delete "Sep. 17, 1998" and insert therefor -- Mar. 8, 1999 --.
Item [30], please delete "(NL)" and insert therefor -- (EP) --.

<u>Column 3,</u>
Line 17, please delete "tie" and insert therefor -- the --.
Line 29, after the end of the sentence, please continue with the next paragraph to make them one complete paragraph.

<u>Column 4,</u>
Line 39, please delete "transfer" and insert therefor -- transfer. --.

<u>Column 6,</u>
Line 29, after the end of the sentence, please continue with the next paragraph to make them one complete paragraph.
Line 42, please delete "poegression." and insert therefor -- progression. --.
Lines 44-45, please delete "connsidered" and insert therefor -- considered --.

<u>Column 7,</u>
Line 13, please delete ".F" and insert therefor -- F. --.
Line 31, please delete "inimized." and insert therefor -- minimized. --.

Signed and Sealed this

Twelfth Day of November, 2002

Attest:

*Attesting Officer*

JAMES E. ROGAN
*Director of the United States Patent and Trademark Office*